United States Patent [19]

Ioannesian et al.

[11] 4,422,823
[45] Dec. 27, 1983

[54] TURBODRILL

[76] Inventors: Rolen A. Ioannesian, naberezhnaya Tarasa Shevchenko, 1/2, kv. 19; Jury R. Ioanesian, Matveevskaya ulitsa, 18, korpus 2, kv. 63, both of Moscow, U.S.S.R.

[21] Appl. No.: 278,395

[22] Filed: Jun. 29, 1981

Related U.S. Application Data

[63] Continuation of Ser. No. 855,544, Nov. 29, 1977, abandoned.

[51] Int. Cl.³ .............................................. F01D 15/06
[52] U.S. Cl. ................................ 415/199.5; 415/502; 415/110; 415/119; 175/107; 403/361
[58] Field of Search ............... 415/502, 122 A, 199.5, 415/110, 119; 464/180; 175/320, 322, 107; 403/292, 293, 298, 361, 15, 31

[56] References Cited

U.S. PATENT DOCUMENTS

| | | | |
|---|---|---|---|
| 1,667,992 | 5/1928 | Sherwood et al. | 415/199.2 |
| 2,113,651 | 4/1938 | Heaston | 64/23 |
| 2,743,083 | 4/1956 | Zublin | 175/322 |
| 2,953,352 | 9/1960 | Webb | 267/125 |
| 2,973,214 | 2/1961 | Bates et al. | 464/180 |
| 3,159,222 | 12/1964 | Hammer et al. | 415/502 |
| 3,356,338 | 12/1967 | Ionesyan et al. | 175/107 |
| 3,754,835 | 8/1973 | Ivanov et al. | 175/107 |
| 3,882,946 | 5/1975 | Ioannesian et al. | |
| 3,989,409 | 10/1976 | Ioannesian | 415/107 |
| 4,308,927 | 1/1982 | Fox | 175/107 |

FOREIGN PATENT DOCUMENTS

| | | | |
|---|---|---|---|
| 1160450 | 2/1958 | France | 175/107 |
| 162068 | 7/1964 | U.S.S.R. | 420/175 |

Primary Examiner—Stephen Marcus
Assistant Examiner—Brian J. Bowman
Attorney, Agent, or Firm—McAulay, Fields, Fisher, Goldstein & Nissen

[57] ABSTRACT

The present invention relates to drilling equipment and more particularly to turbodrills, having a casing with multistage turbine stators fixed therein and a shaft mounted therein. The shaft is formed by a plurality of smaller shafts connected to each other in series, and including a spindle assembly the shaft of which drives a bit into rotation and is mounted in a ball bearing means. According to the invention, the shafts provided with rotors are mounted in ball bearing means and are connected to each other and the shaft of the spindle assembly with the possibility of relative displacement of said shafts. The present turbodrill is used for drilling deep and directional wells. The turbodrill provides a low dynamic load on the bit, elimination of axial and transverse vibrations of the turbodrill shaft, and a long bit life between overhauls.

16 Claims, 5 Drawing Figures

TURBODRILL

This is a continuation of application Ser. No. 855,544 filed Nov. 29, 1977, now abandoned.

The present invention relates to drilling equipment and, more particularly, to turbodrills.

It is most expedient to use turbodrill of the present invention for drilling deep oil or gas wells with the aid of both rock bits and diamond bits.

Moreover, the present invention is useful for drilling directional holes when developing oil or gas fields by clusters.

Known in the art is a turbodrill as disclosed in U.S. Pat. No. 3,882,946 comprising a casing with turbine stators fixed therein and shafts connected in series, provided with rotors, and forming the shaft of the turbodrill. The turbodrill also includes a spindle assembly the shaft of which drives a bit into rotation and is mounted in a ball bearing means. The aforementioned patent and the present application have the same inventive entity.

The known turbodrill is of the multisectional type as the case thereof is sectional and each shaft provided with rotors is mounted in a radial bearing means. A section of the turbodrill comprises a shaft with rotors and a radial bearing means fixed in a casing.

The casings of turbodrill sections are threadedly connected to each other; and for this purpose, the ends of casings are provided with subs and the shafts are rigidly connected to each other by cone spline couplings. The turbodrill section casing next to the spindle assembly is threadedly connected to the spindle assembly casing with the aid of subs, while the shaft of said stage is rigidly connected to the spindle assembly shaft by a cone spline coupling.

The shafts of the sectional shaft of such a turbodrill, rigidly connected to each other by cone spline couplings constitute a single whole. Such a shaft is very massive and, therefore, greatly affects the bit thereby deteriorating bit operation when axial vibration occurs.

The dynamics of an operating bit is especially high when the bottom reaction in the ball bearing means, which is a thrust bearing, equals or approaches oppositely directed hydraulic load when a play in the ball bearing is present. In this case, the bit operation is associated with great axial vibration adversely affecting the bit life.

Moreover, the long turbodrill casing deflects when the weight on the bit is transferred through the drill string and said casing. Therefore, the turbodrill shaft, which has a large inertia moment, rotates in the deflected turbodrill casing. On deflection of the casing, a deflection of the turbodrill shaft also occurs. Therefore, the shaft actually rotates around the axis of the turbodrill casing, rather than the axis of the hole. Because of the considerable inertia moment, the shaft rotation in deflected turbodrill casing leads to the turbodrill casing and shaft transverse vibration transferring to the bit and thus adversely affecting the life thereof.

In this turbodrill, the turbine rotors are in an intermediate position relative to the turbine stators. Therefore, the thrust bearing of the spindle assembly may wear out by the value as much as half of the turbine axial clearance, i.e. 5–6 millimeters, thereby decreasing the life of the turbodrill between overhauls.

The main object of the present invention is to provide a turbodrill eliminating the axial and transverse vibrations of the turbodrill shaft at high rotational speeds and bit weights.

Another object of the present invention is to provide a turbodrill with a considerably lower dynamic load on the bit.

A further object of the present invention is to develop a turbodrill with a long life between overhauls, providing for the long bit life.

There are two types of air gaps in the turbodrill according to the invention. One type of air gap is a predetermined gap which is provided by the construction, for example, between elements of the turbine, and for the sake of clarity, this will be referred to hereinafter as a "clearance," and the other type of air gap is the gap which is formed in the process of the parts working as a result of wear, and for the sake of clarity, this will be referred to as "play." This object of the invention is attained by providing a turbodrill having a casing with stators of a multistage turbine fixed therein and a shaft mounted therein, which is constituted by shafts connected in series and provided with rotors of said turbine and which has a spindle assembly the shaft of which drives a bit into rotation and is mounted in a ball bearing means, and in which, according to the invention, each shaft provided with rotors is mounted in a separate ball bearing means and connected to the neighbouring shaft with a possibility of relative displacement thereof.

Because of the fact that each shaft of the sectional shaft is mounted in the separate bearing means, only the axial vibration of the spindle assembly shaft is mainly transmitted to the bit.

Further, by use of all ball type bearing means, frictional losses between the rotating shaft and casing are kept to a minimum.

The connection of neighbouring shafts to each other with the possibility of relative displacement of said shafts allows for adverse vibration effects on the bit to be eliminated and the mass above the bit to be reduced radically thereby decreasing the dynamic load on the bit.

It is most expedient that in the turbodrill of the present invention the ends of the neighbouring shafts be connected by a slip coupling the half-couplings of which are fixed to the ends of said shaft.

Said slip coupling reduces the axial and transverse shaft vibrations effects on the bit.

It is expedient that the half-couplings have a cross-section with dimensions so as to compensate for the misalignment of the neighbouring shafts. That the shafts can be displaced relative to each other by a certain angle and this makes the sectional shaft flexible and transverse vibration, when the turbodrill casing is deflected, less considerable.

It is expedient that the coupling between the shaft of the spindle assembly and the neighbouring shaft be at least provided with a hydraulic damping device.

Said damping device provides even smaller amplitude of axial vibration of the bit.

The simplest hydraulic damping device is formed in practice by an interstice in the female half-coupling, said interstice communicating with the space between the casing and shaft of the turbodrill and a sealing element in the male half-coupling.

When drilling in hard formations it is expedient that a spring between the half-couplings be provided in the coupling located between the shaft of the spindle assembly and the neighbouring shaft.

The spring provides unclenching the shafts thereby preventing bit bouncing on the bottom.

To increase the turbodrill life between overhauls, it is expedient that each rotor of the turbine be mounted with a minimum axial clearance relative to the respective stator.

In this case, the play resulting from the hydraulic load allowable in the ball bearing means of the turbodrill sections can be made equal to that of the ball bearing.

When a compression spring is employed instead of a hydraulic damper it is also expedient that each rotor mounted on the shaft which is next to the shaft of the spindle assembly be fixed with a maximal axial clearance relative to the respective stator.

The present invention will be further described with reference to an embodiment shown in the accompanying drawings, in which.

Figure 1:
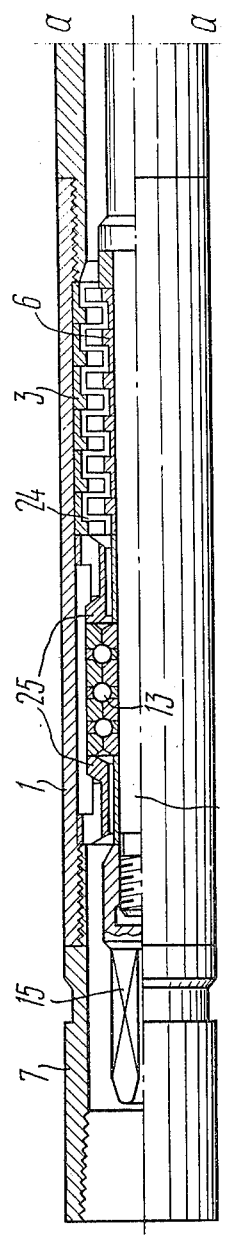
FIGS. 1, 1a and 1b are each a longitudinal section through a turbodrill according to the invention.
Figure 1A:
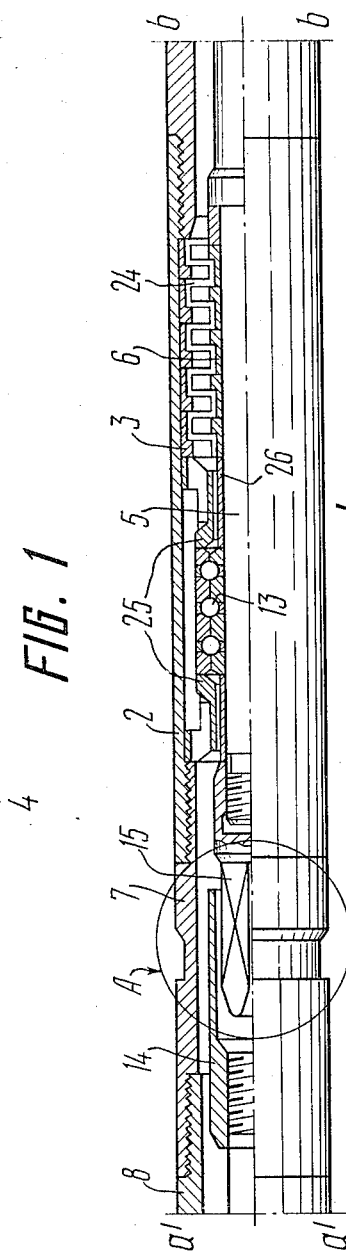
Figure 1B:
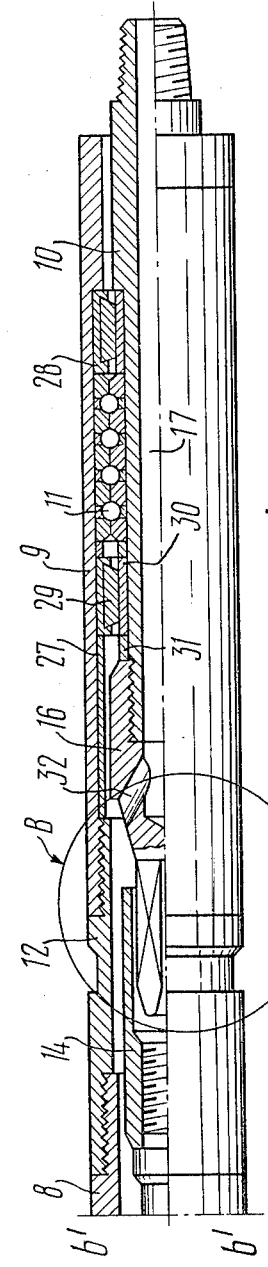

The turbodrill shown in FIG. 1 is two-sectional. In the casing of the turbodrill made of two casings 1 and 2 connected in series are rigidly fixed stators 3 of a multistage turbine and a shaft consisting of shafts 4 and 5 connected in series and provided with rotors 6 of said turbine.

The casings 1 and 2 of the turbodrill sections are connected to each other by subs 7 and 8.

The turbodrill also has a spindle assembly in the casing 9 of which there is a shaft 10 driving a bit into rotation (not shown in the figures). The shaft 10 of the spindle assembly is mounted in the casing 9 in a ball bearing means, which is a multistage radial-axial bearing 11 the inner cages of which are fixed on the shaft 10, while the outer cages are fixed on the casing 9 of the spindle assembly.

The casing 2 of the turbodrill section next to the spindle assembly is connected to the casing 9 of the spindle assembly also by means of subs 7 and 12.

According to the invention, each shaft 4,5 provided with the rotors 6 is mounted in a separate ball bearing means. The inner cages of the bearing 13 are fixed to the shafts 4, 5 while the outer cages, are fixed in the casings, 1,2, respectively, of the turbodrill together with the stators 3 of the turbine.

The shaft 4 provided with the rotors 6 is connected to the shaft 5 which is connected to the shaft 10 of the spindle assembly, relative displacement of said shafts being possible. To this end, the neighbouring ends of said sheets 4, 5, 10 are provided with slide coupling consisting of a female half-coupling 14 and a male half-coupling 15 and 16 fastened to the ends of the neighbouring shafts 4, 5, and 10. The half-couplings 14–15 and 14–16 have cross-sectional dimensions allowing to compensate for the misalignment of the neighbouring shafts 4, 5, and 10 and, therefore, permit some angular displacement of the shafts 4, 5, and 10 relative to each other.

The couplings 14–15 and 14–16 are square in cross-section, and the respective half-couplings 14, 15, and 16 are connected to each other with a clearance thereby permitting, while in operation, some angular displacement of the shaft of one section relative to the shafts of other sections, including the shaft of the spindle assembly.

As the result thereof, there is imparted a flexibility to the sectional shaft of the turbodrill. This flexibility despite the deflection of the casing, decreases radically the transverse vibration of the casing to improve operational conditions for the bit and to increase its life.

Figure 2:
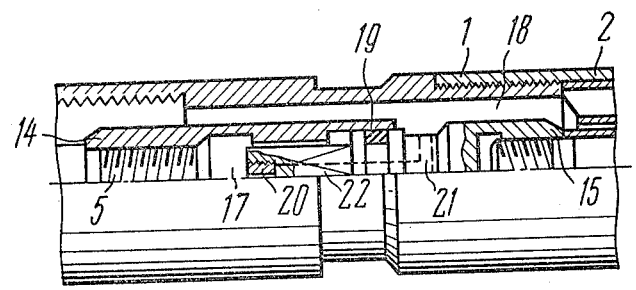
FIG. 2 is a longitudinal section of the connection of the shafts to a hydraulic damping device in a slip coupling.

To further reduce the amplitude of axial vibration, the turbodrill is provided with a hydraulic damping device as shown in FIG. 2, which is placed in the slide couplings 14–15 and 14–16.

The hydraulic damping devices provide the reduction of axial vibration and, therefore, improved bit operation and increased bit rotating life.

The hydraulic damping device used in this turbodrill is formed by an interstice 17 made in the female half-coupling 14, which communicates with space 18 between the casing 2 of the turbodrill and the shaft 5 and a sealing element in the male half-coupling 15. A rubber ring 19 is used as a sealing element, said ring functioning as a piston. The interstice 17 communicates with the space 18 through a choke 20, mounted in the male half-coupling 15, and openings 21 and 22 therein.

These types of connections are both provided between the shafts of the sections and between the shaft of the lower section and the shaft of the spindle assembly, the latter is the most expedient.

Figure 3:
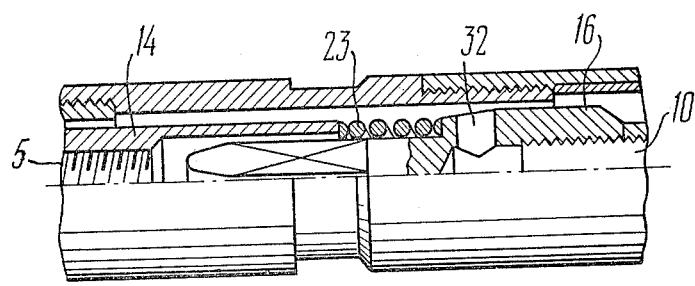
FIG. 3 is a longitudinal section of the connection of the shafts to a spring built in the slide coupling.

To eliminate bit bouncing on the bottom of the hole while drilling in hard rocks, the coupling 14–16 (FIG. 3) between the shaft 10 and of the spindle assembly and the neighbouring shaft 5 is provided with a spring 23 (FIG. 3) the ends of which interact with the half-couplings 14 and 16. The force created by the spring 23 squeezes down the shaft 10 of the spindle assembly and, in case of an axial air gap in the ball bearing means 11, the shaft will not allow for the bit to break away from the bottom of the hole.

The most efficient value of the compressional force of the spring 23 exceeds that of the hydraulic load on the lower section of the turbodrill and approaches the weight on the bit.

The shaft 10 of the spindle assembly can move relative to the shaft 5 of the lower section to a considerable distance in the order of 30–40 millimeters. The distance determines the possible value of an air gap or play in the axial bearing 11 of the spindle assembly and, therefore, the life of said axial bearing.

In the turbodrill of the present invention, all axial bearings are subjected to only one-sided load during drilling operations.

To increase the life of the bearings 13 in the sections of the turbodrill when using slide couplings friction clutches 14–15 and 14–16, without damping devices and therewith, for connection of the shafts 4, 5 of the turbodrill and spindle assembly 10, each rotor 6 of the turbine is mounted with a minimum axial clearance 24 (FIG. 1) relative to the respective stator 3.

For the same purpose when using the spring 23 in the section next to the spindle assembly, each rotor 6 of the turbine is mounted with a maximal axial clearance 24 relative to the respective stator 3.

Distance pieces or spacers 25 are provided to fix the stators 3 and the outer cages of the bearing 13 in the casings 1 and 2 of the turbodrill.

Distance or spacer sleeves are provided to fix the rotors 6 and the inner cages of the bearings 13 to the shafts 4 and 5.

The outer cages of the radial-axial bearing 11 are fixed in the casing 9 of the spindle assembly by a distance sleeve 27 and the outer housing 28 of packing glands 29.

Bushes 30 of the packing glands 29 and a distance sleeve 31 fix the inner cages of the bearing 11.

The half-coupling 16, which is screwed on the shaft 10 of the spindle assembly, is provided with openings 32 for the passage of drilling fluid through the shaft 10 to the bit.

The present turbodrill operates in the following way:

The drilling fluid supplied by mud pumps (not shown in the figures) passes through the drill string (not shown in the figures) and enters the upper sub 7 of the turbodrill. Thence the drilling fluid passes through the distance piece 25 and passing the upper bearing 13, in which shaft 4 of the upper section being mounted therein, enters through the next distance piece 25, and is admitted to the turbine of the upper section. On leaving the last stage of the upper section turbine, the drilling fluid passes through the subs 8 and 7 between the turbodrill sections and enters the next section of the turbodrill, where it flows round the bearing 13, the shaft 5 of said section being mounted therein, and is admitted to the multistaged turbine of the next section.

On leaving the last stage of the lower section turbine, the drilling fluid passes through the subs 8 and 12 and the openings 32 in the half-coupling 16 and is admitted to the hollow shaft 27 of the spindle assembly and thereafter to the bit on the bottom of the hole. While passing through the turbines, the drilling fluid develops a counter-clockwise reactive moment in the system of the turbine stators 3 and a clockwise torque in the system of rotors 6. The torque developed by the turbine rotors 6 is transmitted to the shafts 4 and 5 of the sections, thereby causing rotation of said shafts. The torques on the shafts 4 and 5 of the sections are summed up by the slide coupling 14-15 and are transmitted through the coupling 14-16 to the shaft 10 of the spindle assembly and then to the bit attached to the shaft 10.

In the turbodrill provided only with slide couplings, the axial bearings 13 mounted in the sections for separating the shafts will be subjected only to a downward hydraulic load during drilling operations, while the bearing 11 of the spindle assembly will be loaded by an upward bottom hole reaction minus the hydraulic load acting on the end of the shaft 10. Therefore, the rotors 6 of turbines are mounted with a minimum clearance 24 relative to the respective stators 3.

The slide coupling between the shaft 5 of the lower section and the shaft 10 of the spindle assembly considerably decreases the above-the-bit mass and, therefore, the dynamic load on the bit which, in turn, results in the increase of the bit life.

The slide couplings between the turbodrill sections, allowing for the misalignment of the sections 4, 5, and the stage and the spindle assembly shaft 10 to be compensated, make the sectional shaft of the turbodrill flexible to some extent and reduce transverse vibration of the sectional casing of the turbodrill, thereby also providing for the better bit operation conditions.

In the turbodrill the slide couplings of which are provided with a hydraulic damping device, a certain resistance to the axial displacement of the sections shafts 4, 5, and spindle assembly shaft 10 will be created at the expense of expulsion of the fluid from the interstice 17 by the sealing element 19. This will reduce vibration amplitude and therefore improve bit operation conditions. In this turbodrill, the rotors 6 are mounted with a minimum clearance 24 relative to the respective stators 3. In the turbodrill provided with a spring 23 between the shaft 5 of the lower section and the shaft 10 of the spindle assembly, bounce of the bit on the bottom of the hole is eliminated. To do this, the preliminary compression force of the spring must exceed the hydraulic load on the shaft 5 of the lower section and approach in value the bottom reaction. For this purpose, the rotors 6 of the lower section of the turbine are mounted with a maximum clearance 24 relative to the respective stators 3.

We claim:

1. A turbodrill comprising:
   a casing;
   a multistage turbine in said casing having a plurality of stators and a plurality of rotors, said stators being mounted to and rigidly fixed to said casing;
   a sectional shaft composed of a plurality of releasably connected neighboring shafts, each said connected shaft having a separate one of said rotors mounted thereto;
   first ball bearing means for each said neighboring shaft comprising ball bearings disposed between said casing and each said neighboring shaft separately to said casing;
   connecting means operating to releasably connect said releasably connected shafts serially to one another and being operable to permit relative displacement therebetween at the releasable connection, said connecting means comprising slide couplings formed by a female and a male half-couplings, said half-couplings have a cross-section to compensate for misalignment of neighboring shafts;
   a spindle assembly mounted to one end of said sectional shaft and including a spindle shaft operable to rotatably drive a drilling bit;
   hydraulic damping means forming part of said slide couplings operably disposed between said sectional shaft and said spindle shaft and including an interstice in said female half-coupling, said interstice communicating with the space between the casing of the turbodrill and the shaft thereof and a sealing element placed in the male half-coupling; and
   second ball bearing means disposed between said casing and said spindle assembly, and rotatably mounting said spindle assembly in said casing.

2. The turbodrill as claimed in claim 1 in which each of the turbine rotors is mounted with a minimum axial clearance relative to the respective stator.

3. The turbodrill of claim 1 wherein each said ball bearing comprises bearing balls and inner and outer ball bearing cages which form races for said bearing, each said inner cage being mounted to one of said shafts and each said outer cage being mounted on said casing.

4. The turbodrill as claimed in claim 1, in which the coupling between the shaft of the spindle assembly and the neighboring shaft is provided with a spring placed between the half-couplings.

5. The turbodrill as claimed in claim 4, in which each of the turbine rotor-stator pairs secured to the shaft next to the shaft of the spindle assembly is mounted with a respective rotor-stator clearance equal to the maximum play resulting from the hydraulic load allowable in said ball bearing means.

6. The turbodrill as claimed in claim 4, in which each of the turbine rotor-stator pairs is mounted with a respective rotor-stator clearance equal to the minimum play resulting from the hydraulic load allowable in said ball bearing means.

7. A turbodrill comprising:
a casing;
a multistage turbine in said casing having a plurality of stators and a plurality of rotors, said stators being mounted to and rigidly fixed to said casing;
a sectional shaft composed of a plurality of releasably connected neighboring shafts, each said connected shaft having a number of said rotors mounted thereto;
first ball bearing means for each said neighboring shaft comprising ball bearings disposed between said casing and each said neighboring shaft separately to said casing;
connecting means operating to releasably connect said releasably connected shafts serially to one another and being operable to permit relative displacement therebetween at the releasable connection, said connecting means comprising slide couplings formed by a female and a male half-couplings, said half-couplings have a cross-section to compensate for misalignment of neighboring shafts;
a spindle assembly mounted to one end of said sectional shaft and including a spindle shaft operable to rotatably drive a drilling bit;
hydraulic damping means forming part of said slide couplings operably disposed between said sectional shaft and said spindle shaft and including an interstice in said female half-coupling, said interstice communicating with the space between the casing of the turbodrill and the shaft thereof and a sealing element placed in the male half-coupling; and
second ball bearing means disposed between said casing and said spindle assembly, and rotatably mounting said spindle assembly in said casing.

8. The turbodrill as claimed in claim 7, in which each of the turbine rotor-stator pairs is mounted with a respective rotor-stator clearance equal to the minimum play resulting from the hydraulic load allowable in said ball bearing means.

9. The turbodrill of claim 7 wherein each said ball bearing means comprises bearing balls and inner and outer ball bearing cages which form races for said bearing, each said inner cage being mounted to one of said shafts and each said outer cage being mounted on said casing.

10. The turbodrill as claimed in claim 7, in which the ends of the neighboring shafts are connected by said slide couping, said half-couplings being fasteend to the ends of said shafts and including means to compensate for misalignment of the connected neighboring shafts.

11. The turbodrill as claimed in claim 10, in which said compensating means includes a clearance and said half-couplings have cross-sections the dimensions of which provide for said clearance and allow for misalignment of neighboring shafts to be compensated.

12. The turbodrill as claimed in claim 10, in which the coupling between the shaft of the spindle assembly and the neighboring shaft is provided with a spring placed between said half-couplings.

13. The turbodrill as claimed in claim 10, in which each of the turbine rotor-stator pairs is mounted with a respective rotor-stator clearance equal to the minimum play resulting from the hydraulic load allowable in said ball bearing means.

14. The turbodrill as claimed in claim 11, in which each of the turbine rotor-stator pairs is mounted with a respective rotor-stator clearance equal to the minimum play resulting from the hydraulic load allowable in said ball bearing means.

15. The turbodrill as claimed in claim 12, in which each of the turbine rotor-stator pairs is mounted with a respective rotor-stator clearance equal to the minimum play resulting from the hydraulic load allowable in said ball bearing means.

16. The turbodrill as claimed in claim 12, in which each of the turbine rotor-stator pairs secured to the shaft next to the shaft of the spindle assembly is mounted with a respective rotor-stator clearance equal to the maximum play resulting from the hydraulic load allowable in said ball bearing means.

17. The turbodrill as claimed in claim 9, in which each of the turbine rotor-stator pairs is mounted with a respective rotor-stator clearance equal to the minimum play resulting from the hydraulic load allowable in said ball bearing means.

* * * * *